April 5, 1955     A. R. EXTON-PORTER     2,705,329
BATH APPARATUS

Filed Jan. 26, 1953     2 Sheets-Sheet 1

Arnold R. Exton-Porter
INVENTOR.

BY *Clarence A. O'Brien*
*and Harvey B. Jacobson*
Attorneys

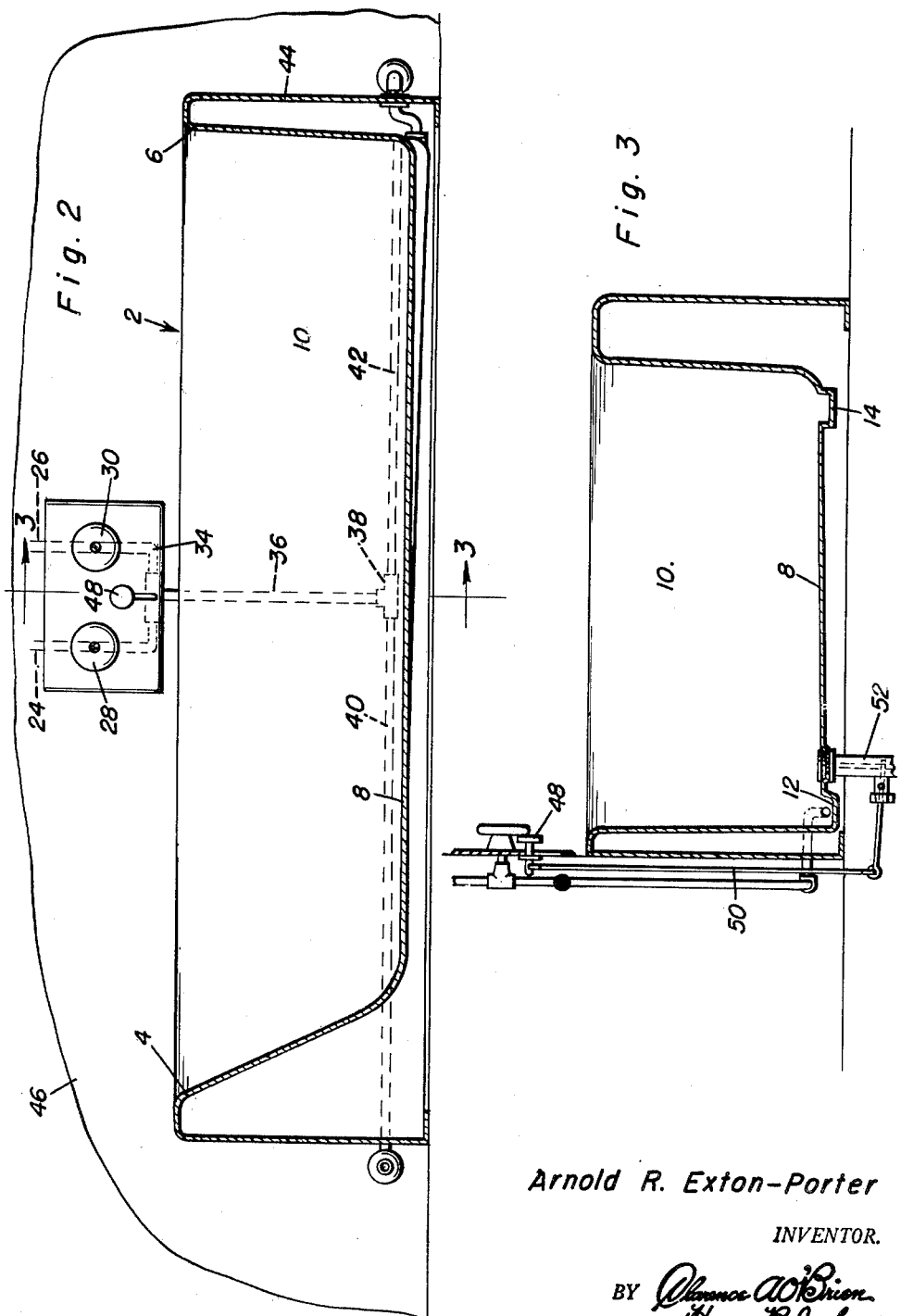

United States Patent Office 2,705,329
Patented Apr. 5, 1955

2,705,329
BATH APPARATUS

Arnold R. Exton-Porter, Hammond, Ind.

Application January 26, 1953, Serial No. 333,030

3 Claims. (Cl. 4—173)

My invention relates to improvements in bath apparatus for bath rooms, and the like.

The primary object of my invention is to provide improved means for supplying hot water and cold water in a bath so that a more uniform mixture is obtained in the bath tub and a more consistent temperature throughout the body of water than can be accomplished with present day bath tubs and water supplies therefor.

Another object is to provide for supplying hot and cold water into opposite ends of the bath tub horizontally so that the hot and cold water will swirl around the bath tub under the pressure from the supply source and be intimately mixed in the bath tub throughout the body of water therein.

Still another object is to provide for supplying hot and cold water horizontally from opposite ends and sides of the bath tub so that the hot and cold water will swirl around the bath tub in relatively opposite directions to intimately mix under swirling action and agitation of the water.

Still another object is to provide a bath tub adapted for the supply of hot and cold water into opposite ends thereof and constructed to direct the incoming water along opposite sides of the bath tub in opposite directions relatively, so as to impart a swirling action to the water and agitate the same to intimately mix the hot and cold water in the bath tub.

Still another object is to provide apparatus for the purposes set forth in the foregoing which is comparatively inexpensive to manufacture and install.

Other and subordinate objects, within the purview of my invention, together with the precise nature of my improvements and the advantages thereof will become readily apparent when the succeeding description and claims are read with reference to the drawings accompanying and forming part of this specification.

In said drawings:

Figure 2 is a view in vertical longitudinal section taken on the line 2—2 of Figure 1; and, Figure 3 is a view in vertical transverse section taken on the line 3—3 of Figure 2.

Figure 1:
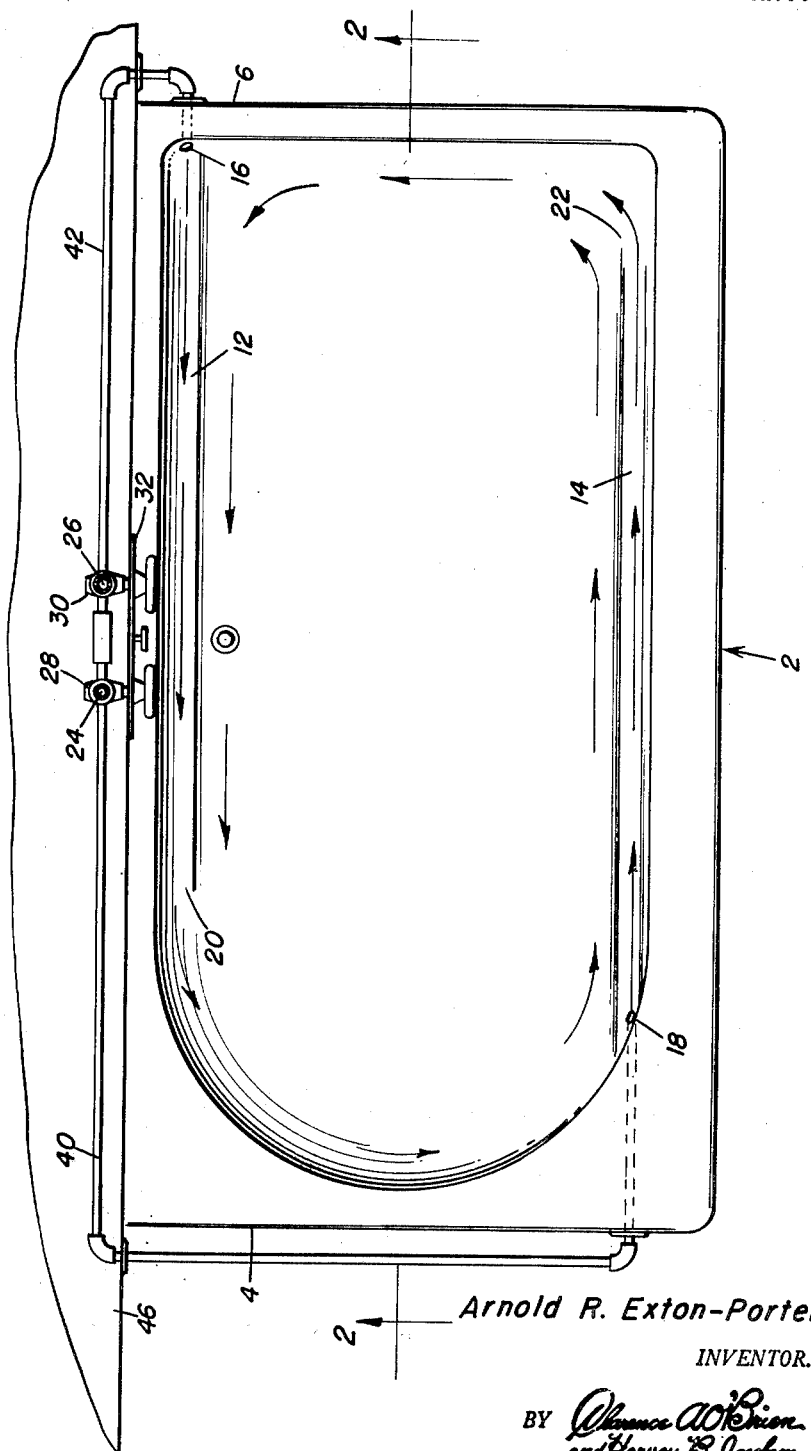
Figure 1 is a fragmentary view in plan illustrating my improved bath tub apparatus in the preferred embodiment thereof.

Referring now to the drawings by numerals, according to my invention, the bath tub 2, preferably of the apron type, and having opposite head and foot ends 4, 6, respectively, is provided in the bottom 8, and at opposite sides of the tub portion 10 with a pair of longitudinally extending narrow gutters, or channels, 12, 14, extending into the tub portion 10 from the foot and head ends 4, 6, respectively, and having outer water intake ends 16, 18, at said ends 6, 4, of said bath tub.

The gutters 12, 14, terminate at inner ends 20, 22, thereof flush with the bottom 8, and short of the ends 4, 6, respectively, that is the ends of the tub portion 10 opposite the water intake ends 16, 18, of said gutters Also the gutters 12, 14, are progressively shallower from the water intake ends 16, 18, thereof to their inner ends 20, 22.

Means for supplying water to the intake ends of the gutters 12, 14, is provided preferably comprising the following. The conventional hot and cold water pipes 24, 26, extend downwardly to a pair of hot and cold water control valves 28, 30, suitably fixed in a wall plate 32, the valves 28, 30, and wall plate 32, being disposed at the rear side of the bath tub 2 preferably in the transverse center of the bath tub. A U-coupling 34 connects the hot and cold water valves 28, 30, to a stand pipe 36 connected at its lower end by T-coupling 38 to oppositely extending, horizontal water lines 40, 42, suitably extended through the apron 44 of the bath tub 2 to the intake ends 18, 16, of the gutters 14, 12, respectively. As will be obvious, the water lines 40, 42, may be reversed to extend to the intake ends of the gutters 12, 14.

While the water lines 40, 42, have been shown as extending out of a wall 46, in which the hot water pipes 24, 26, valves 28, 30, coupling 34, and stand pipe 36 are hidden, it is to be understood that the extending parts of the lines 40, 42, may be hidden in the apron 44 of the bath tub.

A handle 48 in the wall plate 32 is operatively connected in the wall 46 by a vertical link 50 to the conventional "pop-up" drain valve 52 in the bottom 8 of the bath tub 2 adjacent the rear side and transverse center of the bath tub. The bottom 8 slopes downwardly toward the drain 52 as shown in Figure 3.

As will now be seen, hot and cold water may be supplied, either premixed, or separately, in the tub portion 10 at opposite sides and the bottom of the tub portion 10 and will be formed into two streams which are directed in relatively opposite directions longitudinally of the tub portion 10 to be deflected by the ends of the tub portion 10 in opposite directions around said tub portion whereby water is caused to swirl in said tub portion 10 and also around a person occupying the bath tub. As the level of the water rises, these streams become subsurface streams which impart swirling action to the water above the same. The terminal ends 20, 22, and the fact that the gutters 12, 14, are progressively shallow toward said terminal ends direct the water from the gutters upwardly to agitate the body of water in the tub portion 10. Thus hot and cold water is thoroughly and intimately mixed in the tub portion 10 from the start of the filling of the bath tub until the water reaches the desired level. By opening the drain 52 and leaving the water turned on at both valves 24, 26, properly adjusted, a running hot water bath of uniform temperature may be provided because of the swirling action of the water around a person occupying the bath tub. As will be obvious, a running cold water bath may be had by opening the valve 30 controlling the cold water supply pipe only, while the other valve 28 is closed.

The foregoing will, it is believed, suffice to impart a clear understanding of my invention without further explanation.

Manifestly, the invention, as described, is susceptible of modifications without departing from the inventive concept and right is herein reserved to such modifications as fall within the scope of the appended claims.

What is claimed as new is as follows:

1. Bath apparatus comprising a bath tub having parallel sides, ends and a bottom, a gutter in said bottom at one side of the bath tub extending along said side parallel therewith and having a water intake end at one end of the bath tub, a second gutter in said bottom at the other side of the bath tub extending along said other side parallel therewith and having a water intake end at the other end of said bath tub, and means to introduce hot and cold water into said ends of said gutters respectively, said gutters providing for swirling of the water in and around the bath tub.

2. Bath apparatus according to claim 1, said gutters each having a terminal end flush with said bottom and spaced from the end of the bath tub opposite its intake end to direct water running through the gutter upwardly at said terminal end for agitating the water at said terminal end in the bath tub.

3. Bath tub apparatus according to claim 1, said gutters slanting upwardly in relatively opposite directions from the water intake ends thereof to direct the water therein upwardly to agitate the water in the bath tub.

References Cited in the file of this patent

UNITED STATES PATENTS

| | | |
|---|---|---|
| 1,468,565 | Guth | Sept. 18, 1923 |
| 1,616,253 | Clarke | Feb. 1, 1927 |
| 1,626,689 | Pieper | May 3, 1927 |
| 2,529,568 | O'Hara | Nov. 14, 1950 |

FOREIGN PATENTS

| | | |
|---|---|---|
| 21,753 | Great Britain | June 22, 1905 |